United States Patent
Ozog et al.

(10) Patent No.: US 10,989,562 B2
(45) Date of Patent: Apr. 27, 2021

(54) SYSTEMS AND METHODS FOR ANNOTATING MAPS TO IMPROVE SENSOR CALIBRATION

(71) Applicant: Toyota Research Institute, Inc., Los Altos, CA (US)

(72) Inventors: Paul J. Ozog, Ann Arbor, MI (US); Ryan W. Wolcott, Ann Arbor, MI (US); Schuyler H. Cohen, Ann Arbor, MI (US)

(73) Assignee: Toyota Research Institute, inc., Los Altos, CA (US)

( * ) Notice: Subject to any disclaimer, the term of this patent is extended or adjusted under 35 U.S.C. 154(b) by 81 days.

(21) Appl. No.: 16/033,275

(22) Filed: Jul. 12, 2018

(65) Prior Publication Data

US 2020/0018618 A1 Jan. 16, 2020

(51) Int. Cl.
*G01C 25/00* (2006.01)
*G01S 7/40* (2006.01)
*G06T 7/80* (2017.01)
*G01S 7/497* (2006.01)

(52) U.S. Cl.
CPC ............. *G01C 25/00* (2013.01); *G01S 7/40* (2013.01); *G01S 7/497* (2013.01); *G06T 7/80* (2017.01); *G06T 2207/30252* (2013.01)

(58) Field of Classification Search
CPC ........... G01C 25/00; G09B 29/00; G01S 7/40; B60W 60/00; B60W 60/005; B60W 60/0053
USPC ...................................... 701/33.1, 29.1, 29.7
See application file for complete search history.

(56) References Cited

U.S. PATENT DOCUMENTS

| | | | |
|---|---|---|---|
| 6,778,928 B2 | 8/2004 | Stiller | |
| 8,478,642 B2 | 7/2013 | Dey et al. | |
| 9,201,424 B1 | 12/2015 | Ogale | |
| 9,275,458 B2 | 3/2016 | Oh et al. | |
| 9,541,633 B2 | 1/2017 | Rybski | |
| 2005/0274553 A1 | 12/2005 | Salman et al. | |
| 2006/0047381 A1 | 3/2006 | Nguyen | |
| 2009/0290032 A1 | 11/2009 | Zhang et al. | |
| 2012/0173185 A1* | 7/2012 | Taylor | G01S 7/4004 702/104 |
| 2014/0043473 A1 | 2/2014 | Gupta et al. | |
| 2014/0240690 A1 | 8/2014 | Newman et al. | |

(Continued)

*Primary Examiner* — Isaac G Smith
(74) *Attorney, Agent, or Firm* — Christopher G. Darrow; Darrow Mustafa PC (57) ABSTRACT

System, methods, and other embodiments described herein relate to improving calibration of an onboard sensor of a vehicle. In one embodiment, a method includes, in response to acquiring sensor data from a surrounding environment of the vehicle using the onboard sensor, analyzing the sensor data to determine calibration parameters for the onboard sensor. The method includes identifying a suitability parameter that characterizes how well the surrounding environment provides for determining the calibration parameters. The method includes generating annotations within a map that specify at least the suitability parameter for a location associated with the sensor data. In further aspects, the method includes identifying, from the map, a calibration route for the vehicle that is a deviation from a current route in response to determining that the calibration state of the onboard sensor does not satisfy the calibration threshold.

19 Claims, 5 Drawing Sheets

(56) References Cited

U.S. PATENT DOCUMENTS

| | | | |
|---|---|---|---|
| 2015/0241993 A1* | 8/2015 | Gallo | H04L 67/22 |
| | | | 345/156 |
| 2016/0061627 A1 | 3/2016 | Tan et al. | |
| 2016/0161602 A1 | 6/2016 | Prokhorov | |
| 2017/0248426 A1* | 8/2017 | Jesudason | G01C 21/20 |
| 2017/0343654 A1 | 11/2017 | Valois et al. | |
| 2019/0126942 A1* | 5/2019 | Goto | B60Q 9/00 |

* cited by examiner

SYSTEMS AND METHODS FOR ANNOTATING MAPS TO IMPROVE SENSOR CALIBRATION

TECHNICAL FIELD

The subject matter described herein relates, in general, to a system and method for annotating a map for a location according to calibration suitability and, more particularly, to indicating within the map the suitability of different locations for calibrating a sensor such that the map can be subsequently used to support dynamically re-routing a vehicle to calibrate a sensor.

BACKGROUND

Vehicles may be equipped with sensors that facilitate perceiving other vehicles, obstacles, pedestrians, and additional aspects of a surrounding environment. For example, a light detection and ranging (LIDAR) sensor uses light/lasers to scan the surrounding environment, while logic associated with the LIDAR analyzes acquired scan data to detect a presence of objects and other features of the surrounding environment. In further examples, additional sensors such as cameras, radar, and so on may be implemented along with the LIDAR in a combined effort to analyze and identify aspects of the surrounding environment. Moreover, a vehicle can also include sensors to determine aspects relating to motion of the vehicle itself such as inertial measurement units (IMUs), in-wheel sensors, and so on. In this way, a vehicle can perceive the surrounding environment and aspects of the vehicle's motion to navigate and avoid obstacles within the surrounding environment.

However, over time or as the result of various events, the sensors can experience drift and/or other variations within different sensor parameters. The variations can cause, for example, reduced accuracy within data that is acquired by the sensors. For example, the vehicle may encounter a large pothole that jolts an onboard camera thereby causing internal parameters of the camera to lose calibration. As a result, the camera may provide images that lack clarity, are focused at an improper depth of field, or have another calibration issue. Consequently, the reduction in sensor data quality can influence an ability of the vehicle to perceive the surrounding environment and, thus, influence an ability of the vehicle to navigate autonomously and/or employ advanced driver assistance systems.

Moreover, a process of calibrating sensors of a vehicle can be complex. For example, some calibration processes may require particular preconfigured environments or environments with particular characteristics in order to achieve calibration. As an additional matter, different sensors may require different calibration processes because of differing characteristics. Thus, once out of calibration, the vehicle may be unable to continue operating systems that rely on the sensor data (e.g., autonomous driving modes). Additionally, executing a calibration process may be inconvenient because of a need to schedule the vehicle for service or seek out a particular area in which the vehicle can be calibrated.

SUMMARY

In one embodiment, example systems and methods relate to a manner of improving how a vehicle calibrates sensors by leveraging information stored within a map about the suitability of different areas for calibrating sensors of the vehicle. Thus, the disclosed approach accumulates information within the noted map about the suitability of different locations for calibrating the different sensors, and, when needed leverages the accumulated information to route the vehicle through an area that is well suited for calibrating a particular sensor.

As indicated previously, a poor calibration state of one or more sensors can compromise an ability of the vehicle to operate autonomously or perform other tasks. Moreover, the process of re-calibrating the sensors can be difficult due to various environmental characteristics that are used to calibrate the sensors. Accordingly, the presently disclosed systems and methods are generally directed to improving calibration of a vehicle by logging the suitability of various locations for performing calibration processes and then leveraging the knowledge of the locations within the map to calibrate the sensors when needed.

In one embodiment, the calibration system actively monitors a calibration state of the sensors within a vehicle. That is, as the vehicle is traveling along a road, the calibration system is iteratively determining calibration parameters for the sensors. Thus, the calibration system uses the calibration parameters to determine a current calibration state of the sensors. In general, the calibration state indicates an extent of error/noise in current sensor data compared with a permissible calibration threshold. Additionally, the calibration system also determines an amount of uncertainty in the calibration parameters. This uncertainty indicates how well the characteristics of the environment constrain the determination of the calibration parameters and thus how suitable the particular location is for performing the calibration.

As such, when the uncertainty is relatively high, the calibration system can discount the calibration parameters. However, when the uncertainty is relatively low, the calibration system can use the calibration parameters to re-calibrate an associated sensor while also, for example, indicating the suitability within the map by generating an annotation about the location. The calibration system can then store the annotation for subsequent use or provide the annotation to other vehicles.

Furthermore, when the calibration system determines that the calibration state of a sensor indicates that the sensor should be calibrated, the calibration system can selectively re-route the vehicle according to a location previously identified and annotated within the map that is suitable for calibrating the sensor. Thus, the calibration system can route the vehicle through the particular location or, alternatively, disengage systems that rely on the sensors (e.g., autonomous driving mode). In this way, the calibration system can ensure that the sensors are properly calibrated and improve the calibration process through annotating the map and using the map as indicated.

In one embodiment, a calibration system for improving calibration of an onboard sensor of a vehicle is disclosed. The calibration system includes one or more processors and a memory communicably coupled to the one or more processors. The memory stores a calibration module including instructions that when executed by the one or more processors cause the one or more processors to, in response to acquiring sensor data from a surrounding environment of the vehicle using the onboard sensor, analyze the sensor data to determine calibration parameters for the onboard sensor. The memory stores an annotation module including instructions that when executed by the one or more processors cause the one or more processors to identify a suitability parameter that characterizes how well the surrounding environment provides for determining the calibration parameters. The annotation module includes instructions to generate annotations within a map that specify at least the suitability parameter for a location associated with the sensor data.

In one embodiment, a non-transitory computer-readable medium for improving calibration of an onboard sensor of a vehicle and including instructions that when executed by one or more processors cause the one or more processors to perform one or more functions. The instructions include instructions to, in response to acquiring sensor data from a surrounding environment of the vehicle using the onboard sensor, analyze the sensor data to determine calibration parameters for the onboard sensor. The instructions include instructions to identify a suitability parameter that characterizes how well the surrounding environment provides for determining the calibration parameters. The instructions include instructions to generate annotations within a map that specify at least the suitability parameter for a location associated with the sensor data.

In one embodiment, a method for improving calibration of an onboard sensor of a vehicle is disclosed. In one embodiment, a method includes, in response to acquiring sensor data from a surrounding environment of the vehicle using the onboard sensor, analyzing the sensor data to determine calibration parameters for the onboard sensor. The method includes identifying a suitability parameter that characterizes how well the surrounding environment provides for determining the calibration parameters. The method includes generating annotations within a map that specify at least the suitability parameter for a location associated with the sensor data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a manner of annotating a map according to the suitability of calibrating sensors and using the annotations to subsequently determine where to calibrate the sensors are disclosed. As mentioned previously, a vehicle may include multiple sensors for perceiving aspects of the surrounding environment. As such, autonomous driving systems or other systems within the vehicle process sensor data from the sensors to perceive aspects of the surrounding environment. However, the noted sensors can slowly drift out of calibration or otherwise need routine maintenance to ensure operation within specified calibration tolerances such that data provided by the sensors is accurate and reliable. Moreover, the process of calibrating can be cumbersome in that the vehicle on which the sensor is mounted may need to be driven to a service center, dealership, or other specific location that has equipment and/or environmental characteristics that can be used to calibrate the sensors. Therefore, calibrating the sensors can be a process that includes many different difficulties.

Thus, in one embodiment, a calibration system provides for annotating a map with information about the suitability of different locations for calibrating sensors. Furthermore, the calibration system also provides for, in one embodiment, using the annotations within the map to locate the suitable areas for calibrating when needed. Accordingly, in one aspect, the disclosed approach accumulates information within the noted map by actively executing calibration operations as a vehicle is traveling along a route. That is, the vehicle may be an autonomous vehicle or a vehicle that includes various systems that may rely on accurate information from the sensors. Accordingly, the calibration system iteratively determines calibration parameters as the calibration system acquires sensor data along the route. The calibration system uses the calibration parameters as a means to determine whether a current calibration state of the sensor is acceptable.

In general, the calibration state indicates an extent of error in current sensor data compared with a calibration threshold. However, because the system determines the calibration parameters and calibration state from the surrounding environment and not from a controlled/preconfigured environment, the calibration system determines a trustworthiness of the calibration state according to an uncertainty in the calibration parameters. Because the system is executing the calibration process using the sensor data that embodies observations of the present location, the characteristics of the surrounding environment intrinsically influence the calibration parameters. Thus, the uncertainty indicates how well the characteristics of the environment constrain the determination of the calibration parameters and thus how suitable the particular location is for performing the calibration. As such, the calibration system is aware of how well various locations along a route constrain the calibration process since the calibration process is iteratively performed. Accordingly, the calibration system can log the information as annotations within a map for further reference subsequently and/or to inform other vehicles.

Continuing with the discussion of the calibration state, when the calibration system determines that the calibration state of a sensor indicates that the sensor is to be calibrated, the calibration system can identify a location from the map that is well suited for calibrating the particular type of sensor. For example, certain sensors may benefit from executing the calibration process in environments with different characteristics. Thus, one sensor may benefit from an open straight stretch of road while another sensor may benefit from the presence of turns, traffic, and so on. In either case, the calibration system parses or otherwise identifies one or more locations from the map as previously annotated by the vehicle or another vehicle traversing the location while generating the calibration parameters. Thus, in accruing the previously generated determinations of calibration parameters, the map intrinsically indicates through the annotations which areas correspond to the particular desired characteristics.

Therefore, in one embodiment, the calibration system indicates the one or more locations to a passenger, to an autonomous system, or to another system and can thereby request that the vehicle re-route to travel through one of the locations. In various implementations, the calibration system can perform various secondary actions should the passenger and/or system deny the re-routing, such as disengaging a system that relies on sensor data from the afflicted sensor. In either case, the calibration system provides for inducing the vehicle to travel through a location that is suitable for calibrating the sensor and thereby avoiding further drifting within sensor parameters out of calibration while also difficulties associated with visiting a service center to calibrate the sensor. In this way, the calibration system can ensure that the sensors are properly calibrated and improve the calibration process through annotating the map and using the map as indicated.

Figure 1:
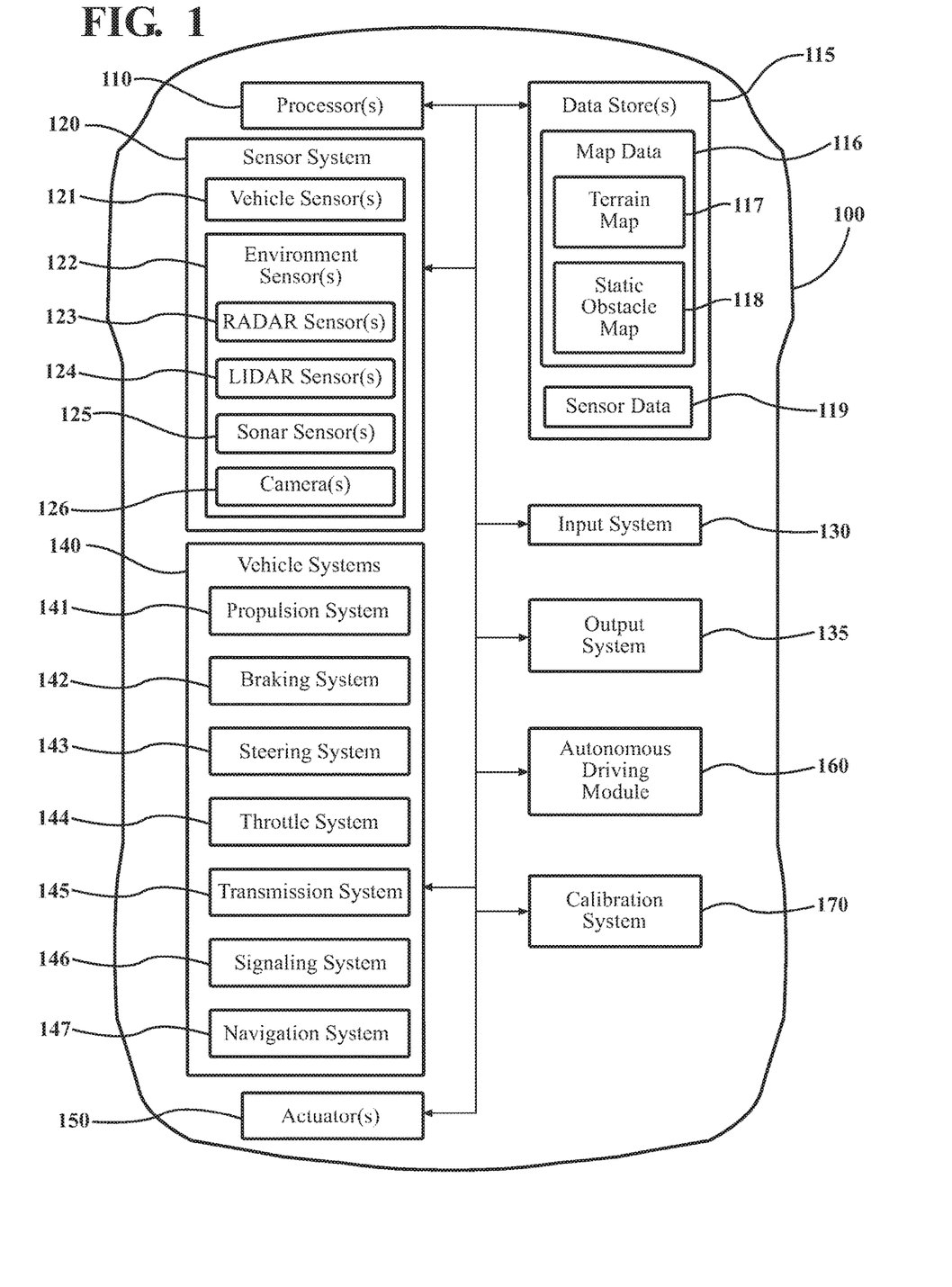
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a calibration system 170 that is implemented to perform methods and other functions as disclosed herein relating to providing for the calibration of sensors within the vehicle 100 through the use of a map that includes annotated locations and a suitability of the annotated locations for calibrating the sensors. The noted functions and methods will become more apparent with a further discussion of the figures.

Figure 2:
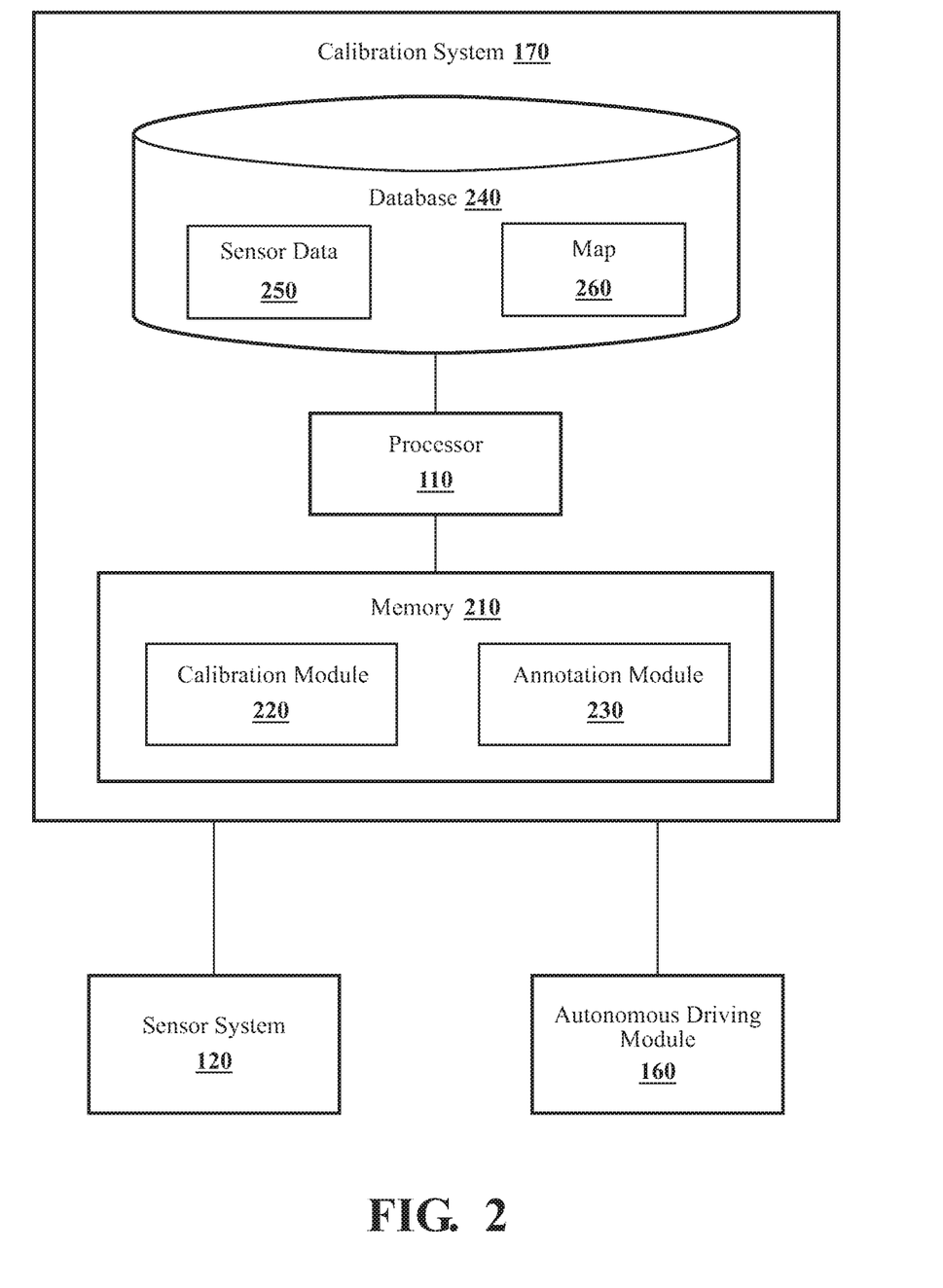
FIG. 2 illustrates one embodiment of a calibration system that is associated with annotating a map according to the suitability of a location for calibrating onboard sensors of a vehicle.

With reference to FIG. 2, one embodiment of the calibration system 170 of FIG. 1 is further illustrated. The calibration system 170 is shown as including a processor 110 from the vehicle 100 of FIG. 1. Accordingly, the processor 110 may be a part of the calibration system 170, the calibration system 170 may include a separate processor from the processor 110 of the vehicle 100 or the calibration system 170 may access the processor 110 through a data bus or another communication path. In one embodiment, the calibration system 170 includes a memory 210 that stores a calibration module 220 and an annotation module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the calibration module 220 generally includes instructions that function to control the processor 110 to receive data inputs from one or more sensors of the vehicle 100 in the form of the sensor data 250. The sensor data 250 is, in one embodiment, scan data that embodies observations of a surrounding environment of the vehicle 100. In general, as provided for herein, the calibration module 220 receives the sensor data 250 from a camera 126, LIDAR 124, radar 123, and/or other sensors that are integrated with the vehicle 100. It should be noted that while environmental sensors are generally discussed, the calibration system functions similarly in relation to internal sensors of the vehicle 100 such as wheel-slip sensors, inertial measurement unit (IMU), and so on.

Furthermore, in one embodiment, the calibration system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, other information that is used by the modules 220 and 230 such as a map 260 and calibration parameters.

For example, the sensor data 250 can include 3D point cloud data, radar information, camera images, and so on along with, for example, metadata describing additional characteristics (e.g., location) about the sensor data 250. Moreover, in one embodiment, the database 240 also includes a map 260. As an additional note, while the sensor data 250 and the map 260 are illustrated as being stored within the database 240, in various embodiments, at least a portion of the map 260 and/or the sensor data 250 is stored in the memory 210, in a remote cloud-based storage, or in another data store as may be appropriate for system requirements of a particular implementation.

In either case, the map 260 is generally understood to be a map of a road network. Thus, the map 260, in one embodiment, includes a navigation-style network of roads with road names, locations, and so on. In further aspects, the map 260 can include additional information as may be used by the vehicle 100 and/or passengers of the vehicle 100. In either case, the map 260 includes annotations as generated by the annotation module 230 about the suitability of different locations for calibrating different sensors. As will be discussed further subsequently, the annotations are, in one embodiment, electronic data structures that are integrated with the map 260 and include structures for storing information such as a location of a general area over which data for a calibration process was acquired, a direction of travel when acquiring the data, a day/time, calibration parameters produced from the data, a sensor type associated with the data, an uncertainty associated with the calibration parameters, and so on. In this way, the annotations generally provide for characterizing the suitability of different segments or points along roads for performing calibrations of different sensors.

In either case, the calibration module 220 generally includes instructions that function to control the processor 110 to calibrate one or more sensors of the sensor system 120. Moreover, the calibration module 220, in one embodiment, also determines the suitability of locations for future calibrations. Consider that the calibration module 220 is iteratively determining a calibration state for sensors of the sensor system 120 as the vehicle 100 is operating. Thus, for each separate determination of the calibration state, the calibration module 220 receives the sensor data 250 from a particular sensor. As an initial note, this discussion will generally reference performing the calibration for a single sensor; however, as previously indicated, the calibration system 170 generally performs the noted actions, in one embodiment, for each sensor within the vehicle 100 for which characteristics of the environment affect the dynamic calibration of the sensor. In further aspects, the calibration process executed by the calibration module 220 can include calibrating/registering two or more sensors of the vehicle 100 together.

Accordingly, the calibration module 220 initially determines calibration parameters for the sensor using the sensor data 250. As a further note, it should be appreciated, that the manner in which the sensor data 250 is acquired may vary on a sensor-to-sensor basis. That is, a calibration process for one sensor may differ from a calibration process for another sensor in relation to a duration over which the sensor data 250 is collected, whether the sensor data 250 includes a single acquisition of data or multiple successive acquisitions, and/or other variables relating to the particular collection of the sensor data 250. Moreover, the calibration module 220 acquires the sensor data 250 as the vehicle 100 travels along a road, is stopped at a traffic light/sign, or, more generally, at any point while the vehicle 100 is operating, and that conforms with needs of a particular calibration process.

Once collected, the calibration module 220 generates the calibration parameters by, in one embodiment, analyzing the sensor data 250 according to a modeling approach that estimates the calibration parameters. In further aspects, the calibration module 220 generates the calibration parameters according to a particular algorithmic process. For example, in one or more embodiments, the calibration module 220 implements a linear regression approach, polynomial regression, nonlinear regression approach, least squares approach, or another suitable manner of determining the calibration parameters from the acquired sensor data. The calibration parameters generally differ for different sensors but may include internal offsets, transformation parameters, orientation parameters, or other calibration parameters that are generally known in the art for calibrating sensors such as LiDAR sensors, cameras, stereoscopic cameras, radar, IMU sensors, wheel sensors, and so on.

Furthermore, as part of determining the calibration parameters, the calibration module 220 determines whether the calibration parameters indicate that the sensor is presently within a tolerance for being considered calibrated. The calibration of a particular sensor can generally span a spectrum from, for example, being precisely calibrated to being out of calibration and not useful. Thus, the calibration module 220 determines the calibration state according to a calibration threshold. In one embodiment, the calibration threshold indicates an acceptable amount of error between the calibration parameters and an ideal calibration of the sensor. For example, when a calibration state of a sensor indicates that the sensor is calibrated, a particular calibration parameter, e.g., an offset, may be near zero. By contrast, the calibration parameters determined by the calibration module 220 may indicate several degrees of offset. Accordingly, the calibration threshold indicates, for example, an extent of the offset that is acceptable before the sensor generates the sensor data 250 with excessive noise or other characteristics which renders the sensor data 250 no longer useful for performing associated tasks.

Moreover, the calibration threshold, in one embodiment, indicates a combination of tolerances/thresholds for multiple calibration parameters. When a particular sensor includes more than a single calibration parameter, the calibration threshold can indicate that each parameter is to be within an associated threshold or a particular calculation may provide for normalizing and combining the parameters to indicate an overall calibration threshold of the sensor. In either case, the calibration module 220 determines or otherwise proposes a calibration state of the sensor according to a comparison of the calibration parameters with the calibration threshold. The calibration state can indicate distinct categories, a sliding scale, or another suitable manner of conveying the present condition of the sensor in relation to the calibration parameters. For example, the calibration state can "indicate out of calibration," "marginal calibration," "good calibration," and "excellent/new calibration." Alternatively, or additionally, the calibration module 220 may indicate a numerical score (e.g., 0 to 100) for the calibration state.

Accordingly, the calibration module 220, in one embodiment, uses the calibration parameters to at least determine the calibration state and, in one or more embodiments, to also calibrate the sensor on-the-fly. However, the reliability of the calibration state determined from the calibration parameters and by extension the surrounding environment associated with the sensor data 250 may not provide for an adequate determination of the calibration parameters. That is, because of characteristics of the different sensors, environments with particular characteristics (i.e., roadway configurations and surrounding features) constrain the determination of the calibration parameters differently (i.e., with different degrees of uncertainty). By way of example, the calibration module 220 may better constrain the determination of calibration parameters for a wheel sensor when the roadway is straight and smooth. Thus, when the roadway is curvy and bumpy, the calibration module 220 still determines the calibration parameters for the wheel sensor, however, noise within the sensor data from the characteristics of the roadway results in the calibration parameters having a high level of uncertainty.

Therefore, even though the calibration module 220 determines the calibration state according to the calibration parameters, an uncertainty of the calibration parameters due to the ability of the environment to constrain the determination of the calibration parameters may not be acceptable to an extent that the calibration parameters are considered reliable. Accordingly, the calibration module 220 determines the uncertainty of the calibration parameters to identify whether the calibration parameters are suitable for accepting the calibration state and then executing a calibration process and/or recommending calibration.

Additionally, the annotation module 230 uses the uncertainty to determine whether the location associated with the sensor data 250 that produced the calibration parameters is suitable for calibrating the associated sensor. That is, in one embodiment, the annotation module 230 generally includes instructions that function to control the processor 110 to determine whether the uncertainty satisfies an annotation threshold indicating that the surrounding environment is well suited for determining the calibration parameters and thus for calibrating the sensor. The uncertainty may also be referred to herein as the suitability parameter. In either case, the uncertainty generally indicates an accuracy of the calibration parameters. As such, the annotation threshold is, for example, selectable according to a particular implementation. That is, the particular extent of uncertainty that is determined to be acceptable for calibrating the sensor may be determined according to a degree of desired accuracy in the sensor. In further aspects, the annotation threshold is objectively determined according to details of the particular sensor.

Upon determining that a particular location is suitable for calibrating the sensor, the annotation module 230 generates an annotation about the location. As previously indicated, the annotation itself can include various information according to a particular implementation but generally includes at least an indication of the type of sensor and an indication that the location is suitable for calibration. Furthermore, the annotation module 230, in one embodiment, stores the annotation within the map 260. Thus, the annotation module 230 modifies the map 260 to indicate the information such that as the vehicle 100 is traveling/navigating the information about the suitability for calibrating is readily available. In further aspects, the annotation module 230 communicates the annotations to a cloud-based service or another remote service that, for example, distributes the annotations to other vehicles that may be similarly configured with the same sensor. Likewise, the calibration system 170 may receive the annotations from the cloud-based service, directly from V2V communications with another vehicle, V2I communications with local infrastructure, and so on.

Further consider that the calibration module 220 improves the calibration of sensors within the vehicle 100 by using the annotations provided within the map 260. For example, the calibration module 220 determines whether the sensor is presently calibrated or not according to the calibration state. Thus, when the calibration module 220 determines that the sensor needs to be calibrated, the calibration module 220 can calibrate the sensor using the available calibration parameters and/or determine a route from the map 260 that includes a location that is well suited for calibrating the sensor, as previously annotated.

Even though the calibration module 220 may be able to calibrate the sensor using the calibration parameters that were just acquired, best practice and/or regulations may dictate that the sensor is to be calibrated according to a location that is proven to provide reliable results. That is, the recently acquired calibration parameters may have an acceptable uncertainty but have not yet been corroborated by another vehicle, may have a marginal uncertainty, or may have an unacceptable uncertainty and, thus, the calibration module 220 determines a location to calibrate the sensor from the map 260.

The calibration module 220 can select the location according to proximity, suitability, placement along a proposed route, according to passenger/driver preference, or another condition as may be programmed. Furthermore, the calibration module 220, in one embodiment, presents the passenger/driver with the option of re-routing to drive through the location so that the sensor can be calibrated. In one embodiment, if the re-routing is denied by the passenger/driver, then the calibration system 170 may disengage systems that use/rely on the sensor (e.g., autonomous driving module 160, advanced driver assistance systems, etc.). In further aspects, the calibration module 220 determines a secondary route with suitable but possibly less desirable calibration locations as indicated within the map 260. The calibration module 220 may determine the alternative locations to sustain the calibration state of the sensor until a more desirable location may be navigated. As a further aspect, the calibration module 220 can provide reminder indications according to a current calibration state such that as the calibration state declines, the indications can become more imperative to incentivize the driver/passenger to permit navigation through the location in a preventative manner as time may be available.

Once the vehicle 100 does navigate to the location specified by the calibration system 170, the calibration module 220 performs the calibration for the sensor to improve operation thereof. The calibration module 220 can then continue to monitor the calibration state of the sensor and may also provide updated information about the location as a further annotation to the map 260. In this way, the calibration system 170 improves the operation of sensors within the vehicle 100 and ensures that the sensors are functioning appropriately to support the various systems of the vehicle 100. Moreover, the disclosed approach not only improves the functioning of the sensors, but also improves the operation of the related systems that use the sensor data 250 produced therefrom.

Figure 3:
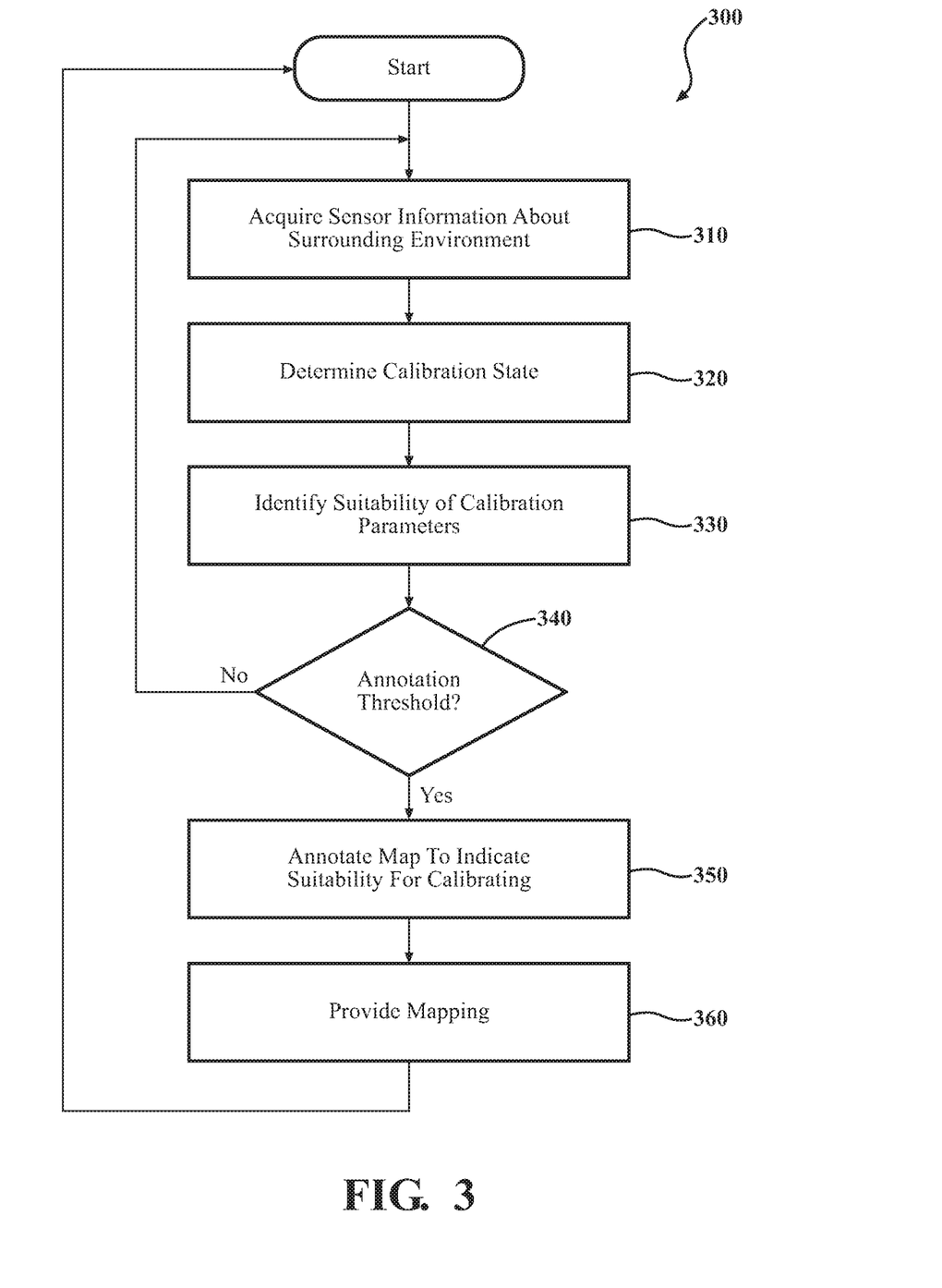
FIG. 3 illustrates one embodiment of a method associated with annotating a map.

Additional aspects of dynamically calibrating sensors of the vehicle 100 using an annotated map and determining the suitability of locations for calibration will be discussed in relation to FIG. 3. FIG. 3 illustrates a flowchart of a method 300 that is associated with annotating locations within a map according to the suitability for calibrating. Method 300 will be discussed from the perspective of the calibration system 170 of FIGS. 1, and 2. While method 300 is discussed in combination with the calibration system 170, it should be appreciated that the method 300 is not limited to being implemented within calibration system 170, but is instead one example of a system that may implement the method 300. Moreover, method 400 of FIG. 4, which illustrates a process of selectively re-routing the vehicle 100, will be discussed from the same perspective as the method 300 and will be discussed subsequent to the method 300.

At 310, the calibration module 220 controls at least one onboard sensor of the vehicle 100 to acquire at least a portion of the sensor data 250. In one embodiment, the calibration module 220 controls the LIDAR sensor 124 to produce the sensor data 250 as a 3D point cloud representing the surrounding environment. Alternatively, the calibration module 220 controls a camera 126 to acquire images of the surrounding environment as the sensor data 250. In further aspects still, the calibration module 220 controls the radar 123, the sonar 125, an IMU, a wheel sensor, or another sensor either in isolation or in combination to acquire the sensor data 250. Moreover, in further embodiments, the calibration module 220 controls the one or more onboard sensors to at least semi-continuously operate and provide the sensor data 250. Thus, the calibration module 220, in one embodiment, iteratively executes the functions discussed at blocks 310-360 to acquire the sensor data 250 and calibrate the onboard sensors therefrom. The calibration module 220 may execute one or more of the noted functions in parallel to maintain updated calibrations and may also execute the noted functions separately and in parallel for the separate sensors of the vehicle 100.

At 320, the calibration module 220 determines a current calibration state of the onboard sensor. In one embodiment, the calibration module 220 loads the sensor data 250 acquired by the onboard sensor and proceeds by analyzing the sensor data 250 to determine calibration parameters for the onboard sensor. In further aspects, the calibration module 220 processes the sensor data 250 as a stream of data as the onboard sensor is acquiring the sensor data 250. In either case, the calibration parameters, as previously discussed, include aspects relating to the configuration of the onboard sensor. Accordingly, the calibration parameters vary according to sensor type. For example, the calibration parameters can include alignment parameters, orientation parameters, translational parameters, temporal parameters, focal parameters, and so on.

The calibration module 220 at 320 further determines whether the calibration parameters satisfy a calibration threshold. As previously discussed, the calibration threshold indicates an extent of error between the calibration parameters and defined operating parameters for operating the onboard sensor. The defined operating parameters represent values of the various aspects of the onboard sensor that are expected for operating the onboard sensor to provide accurate information. Thus, the defined parameters are, for example, factory defined values for various configurable aspects of the onboard sensor. Accordingly, the calibration parameters represent current values of the defined operating parameters and the error therebetween is a variance from expected operating characteristics. Therefore, the calibration threshold indicates a tolerance for the error beyond which the onboard sensor is out of calibration and considered to be providing information that is out of tolerance and likely to include a poor signal to noise ratio and/or generally inaccurate information.

In either case, the calibration module compares the calibration parameters against the defined parameters to determine the extent of the variance. When the extent of variance is beyond the calibration threshold, the calibration module 220 indicates that the calibration state is out of calibration. Of course, in further embodiments, the calibration module 220 can indicate degrees of calibration as a manner of providing the calibration state such as in the case of a percentage, a series of characterizations, and so on. Accordingly, the calibration module 220 may proceed to calibrate the onboard sensor using the calibration parameters according to the determination of the calibration state. However, in one embodiment, the calibration module 220 may perform the calibration subsequently once the uncertainty has been determined to avoid using calibration parameters that are not constrained.

At 330, the annotation module 230 determines a suitability parameter that characterizes the calibration parameters. In one embodiment, the suitability parameter is the uncertainty embodied within the calibration parameters. The uncertainty and the suitability parameters were previously discussed and thus will not be revisited in detail; however, it should be appreciated that the suitability parameter generally characterizes whether the location from which calibration module 220 acquires the sensor data 250 is suitable or not for calibrating the particular sensor. The suitability parameter itself generally indicates a degree of uncertainty or, stated otherwise, a probability that the calibration parameters are an accurate approximation of the current condition of the onboard sensor. Thus, the suitability parameter is useful in determining whether to apply the calculated calibration parameters and whether the location from which the associated sensor data 250 was acquired is generally suitable for subsequent calibrations.

At 340, the annotation module 230 determines whether the suitability parameter satisfies the annotation threshold. The annotation threshold indicates a threshold value for the suitability parameter that identifies whether characteristics of the sensor data 250 sufficiently constrain determination of the calibration parameters such that the calibration state of the onboard sensor is corrected by applying the calibration parameters. When the suitability parameter does not satisfy the annotation threshold, the calibration parameters are considered to be, for example, insufficient to calibrate the onboard sensor and are thus discarded. When the annotation module 230 determines that the suitability parameter indicates the location is suitable for calibrating the onboard sensor according to the annotation threshold, then the annotation module 230 proceeds to annotate the map 260 as discussed at block 350.

At 350, the annotation module 230 generates an annotation within the map 260. In one embodiment, the annotation is integrated within the map 260 such that the annotation corresponds to the location at which the sensor data 250 for generating the calibration parameters was acquired. The location may be a point along a road, a segment of the road, an area visible from the road, and so on. As a general matter, the location may be distinct for each type of sensor and for each separate acquisition. Thus, the annotation module 230 can selectively generate the annotation to correspond with a segment/span of the road and/or a point along the road. Moreover, the annotation itself can indicate further information such as a direction of travel, and other characteristics of the location associated with how the calibration module 220 acquired the sensor data 250 used to produce the calibration parameters. Moreover, the annotation may also include attributes of the particular sensor and the calibration process by which the suitability parameters was determined.

Figure 4:
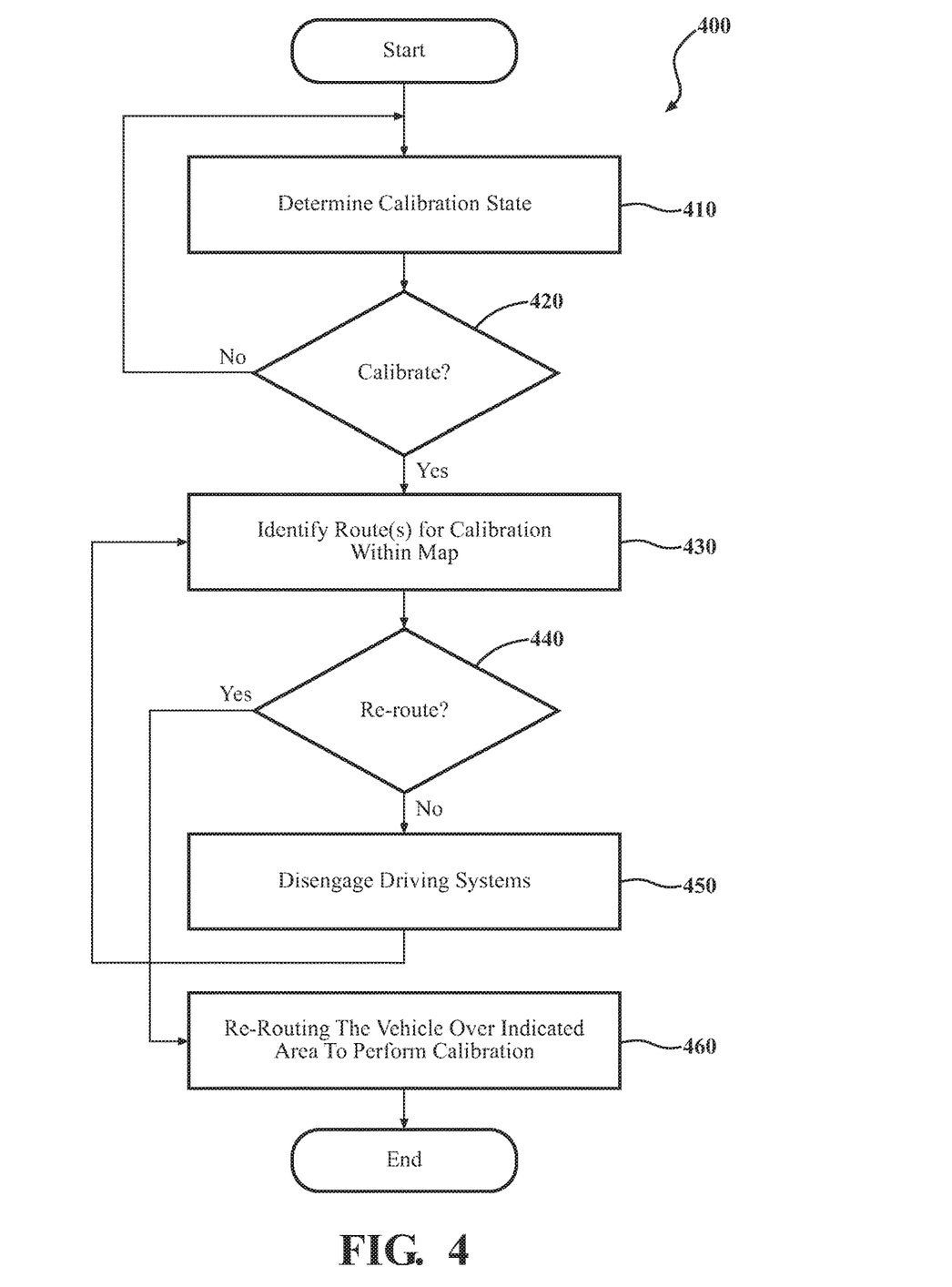
FIG. 4 illustrates one embodiment of a method associated with calibrating onboard sensors of a vehicle using a map of locations that are suitable for the calibrating.

As a further matter, while the annotation module 230 is generally discussed herein as annotating the map 260 when a location is assessed to be suitable for performing calibration, the annotation module 230 may also annotate locations when the locations are determined to be unsuitable. Thus, the annotation module 230 may annotate the map 260, in one embodiment, with suitability parameters along a whole route about whether each subsequent iteration of the calibration operation determines an extent to which the associated location is suitable for calibrating. Thus, the annotation module 230 can provide a finer granularity of information about entire routes. Moreover, the indications of the poor or limited suitability of a location may be, in some circumstances, provided in contrast to annotations by other vehicles. The contradicting annotations may be due to performing the calibrations under different weather conditions, light conditions, and so on. Thus, the calibration module 220 may subsequently assess a listing of annotations for a location when determining a suitable location in which to calibrate the onboard sensor as discussed in relation to method 400. In either case, the annotation module 230 logs information about the calibration parameters for the location at 350.

At 360, the annotation module 230 provides the map 260 with the annotations to additional vehicles that include one or more sensors similar to the onboard sensor. In one embodiment, the annotation module 230 electronically communicates the map 260 or a separate listing of the annotations from the map 260 over a wireless communication channel. The annotation module 230, in one embodiment, communicates the annotations to other vehicles directly through, for example, an ad-hoc communication protocol. In further aspects, the annotation module 230 communicates the annotations to the other vehicles by using a centralized hub such as a cloud-based mapping service or another suitable network-based service.

With reference to FIG. 4 and method 400, at 410, the calibration module 220 determines the calibration state as discussed previously in relation to block 320. Thus, in one embodiment, block 320 and block 410 are the same process but are shown as separate elements herein for purposes of discussion.

At 420, the calibration module 220 determines whether to calibrate the onboard sensor according to the calibration state. In one embodiment, the calibration module 220 determines whether the calibration state indicates that the sensor is out of calibration or nearly out of calibration to indicate that the sensor needs calibration. In one embodiment, the calibration module 220 may also reference the suitability parameter to determine whether the determination of the calibration state is accurate. That is, if the present environment provided for uncertainty in the determination of the calibration state because the present environment did not constrain the determination of the calibration parameters well, then proceeding with calibrating the onboard sensor may be needless. In either case, when the calibration state indicates that the onboard sensor is to be calibrated, then the calibration module 220 proceeds to determine a suitable location.

At 430, the calibration module 220 identifies a calibration route within the map 260 that includes a suitable location for calibrating the onboard sensor. In one embodiment, the calibration module 220 parses the locations within the map 260 that have been annotated as suitable for the particular sensor and selects one of the locations. In further aspects, the calibration module 220 further considers current/dynamic conditions such as time of day, weather, and other relevant factors when selecting a location from the map 260.

From the selected location, the calibration module 220 can generate a route for the vehicle 100. In various embodiments, the precise manner of selecting the location for calibrating the onboard sensor can vary but generally the calibration module 220 prioritizes proximity of the location to a current and/or planned route of the vehicle 100 while considering the other noted factors. In this way, the calibration module 220 can provide a route that minimally deviates the vehicle 100 from a current route. In further aspects, the calibration module 220 can select the location/route according to other priorities and/or combinations of priorities. For example, the calibration module 220 can determine a location with a highest certainty for calibrating the onboard sensor, a location that is proximate to locations for calibrating other sensors that need calibration, and so on.

At 440, the calibration module 220 requests to re-route the vehicle 100 through the identified location from 430. In one embodiment, the calibration module 220 provides an indicator to a passenger/driver about the re-routing. The calibration module 220 may generate the indicator as an electronic message rendered within a display screen within the vehicle 100. Thus, the indicator may be a message requesting the driver to drive the noted route. In further embodiments, the indicator requests approval of the driver/passenger for the vehicle 100 to autonomously navigate the proposed route. In either case, the passenger/driver either approves the re-routing by indicating permission to navigate autonomously over the proposed route or by manually driving the proposed route as provided for at 460. However, if the passenger/driver denies permission, then the calibration module 220 proceeds with block 450.

At 450, the calibration module 220 disengages driving systems that use the sensor data 250 of the onboard sensor that is out of calibration. In one embodiment, the calibration module 220 disengages the driving systems to avoid using unreliable sensor data to control systems of the vehicle (e.g., disengage autonomous driving module 160). In further examples, instead of disengaging the noted systems, the calibration module 220 may select a secondary route, select secondary locations for calibrating or at least maintaining a current calibration state of the onboard sensor until the more suitable location can be navigated, and so on.

Moreover, the calibration module 220 may iteratively cycle through blocks 430 and 440 until the passenger/driver permits the vehicle 100 to navigate a suitable location for calibrating the onboard sensor. In this way, the calibration system 170 does not permit use of the onboard sensor that is out of calibration until the driver/passengers permits navigation of the identified route. As a further note, the calibration system 170, in one embodiment, may provide the indication of calibration state at 440 as a warning that the onboard sensor needs calibration soon. Thus, in such a case, at 450, the calibration module 220 may continue to provide a warning about the calibration state until the calibration state actually exceeds the calibration threshold or the calibration process is undertaken to correct the issue.

Figure 5:
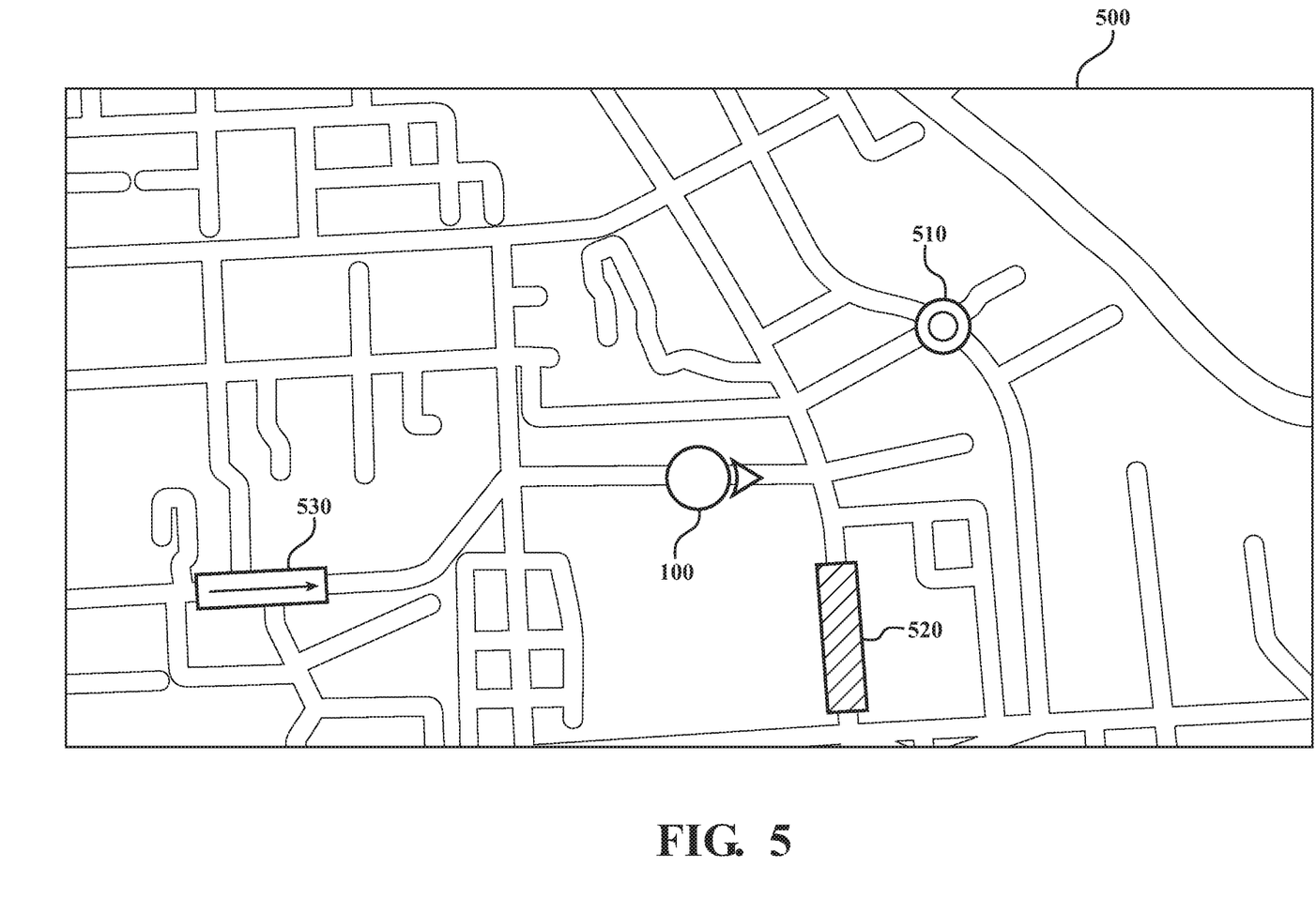
FIG. 5 is an example illustration of a portion of a map that includes annotations as described herein.

Further aspects of calibrating onboard sensors of a vehicle and using a map of annotated locations will be discussed in relation to FIG. 5. FIG. 5 illustrates a portion of a map 500 (e.g., the map 260) that includes annotations about locations for calibrating onboard sensors of the vehicle 100. As shown in FIG. 5, the map 500 includes three separate annotations 510, 520, and 530. It should be appreciated from the previous discussion that the annotations 510, 520, and 530 may have been generated by the calibration system 170 within the vehicle 100 and/or by other vehicles that have communicated the annotations to the vehicle 100 through the variously disclosed mechanisms. Moreover, the illustrated annotations 510, 520, and 530 are provided as a manner of describing different aspects of how the annotation module 230 generates the annotations and does not represent a comprehensive listing of possible forms in either style or quantity.

In either case, the map 500, as illustrated, is generally a navigation type of map that includes a network of roads in a generally geographically accurate configuration. The map 500 is further displaying a present location of the vehicle 100 within the map 500. The annotation 510 is illustrated as a point annotation indicating a particular location that is suited for calibrating an onboard sensor of the vehicle 100 (e.g., a LiDAR sensor). By contrast, the annotations 520 and 530 identify segments of roadway that are suitable for calibrating. Accordingly, depending on a type of the particular sensor and an associated calibration process, a respective annotation may be a point annotation defining a distinct location that is characterized by an area immediately surrounding the annotation or a segment annotation defining a stretch of roadway and aspects relating thereto. Moreover, the annotations may include further indicators such as a direction of travel (e.g., lane) that was associated with the suitability determination, as seen with the annotation 530. As previously mentioned, the annotations may include further information such as indicators about a sensor type, firmware versions, time of day, current traffic conditions, weather, and so on. Additionally, it should be further appreciated that while the annotations 510, 520, and 530 are illustrated in graphic form, in various embodiments, the annotations are provided within a data layer of the map and are not necessarily provided in a visual form.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the calibration system 170, and/or the autonomous driving module(s) 160 may control some or all of these vehicle systems 140 and, thus, may be partially or fully autonomous.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110, the calibration system 170, and/or the autonomous driving module(s) 160 can be in communication to send and/or receive information from the various vehicle systems 140 to control the movement, speed, maneuvering, heading, direction, etc. of the vehicle 100. The processor(s) 110, the calibration system 170, and/or the autonomous driving module(s) 160 may control some or all of these vehicle systems 140.

The processor(s) 110, the calibration system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the calibration system 170, and/or the autonomous driving module(s) 160 can control the direction and/or speed of the vehicle 100. The processor(s) 110, the calibration system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the infrastructure module 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the context module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A calibration system for improving calibration of an onboard sensor of a vehicle, comprising:
    one or more processors;
    a memory communicably coupled to the one or more processors and storing:
        a calibration module including instructions that when executed by the one or more processors cause the one or more processors to, in response to acquiring sensor data from a surrounding environment of the vehicle using the onboard sensor, analyze the sensor data to determine calibration parameters for the onboard sensor; and
        an annotation module including instructions that when executed by the one or more processors cause the one or more processors to identify a suitability parameter that characterizes how well the surrounding environment provides for determining the calibration parameters,
        wherein the annotation module includes instructions to generate annotations within a map that specify at least the suitability parameter for a location associated with the sensor data, wherein the annotations specify which locations in the map are suitable for calibrating different types of sensors of the vehicle including the onboard sensor according to the suitability parameter, and
        wherein the calibration module includes instructions to re-route the vehicle that is operating autonomously to travel along a calibration route that is a new route and calibrate the onboard sensor when a calibration state of the onboard sensor does not satisfy a calibration threshold, wherein the calibration module includes instructions to re-route the vehicle by causing the vehicle to deviate from a current route to follow the calibration route that includes a calibration area that is along and part of the calibration route when in route to a final destination that is common to the current route and the calibration route, and
        wherein the calibration module includes instructions to re-route including instructions to request permission to re-route the vehicle from a passenger riding in the vehicle and to disengage autonomous operation of the vehicle when the passenger denies the permission to re-route.

2. The calibration system of claim 1, wherein the annotation module includes instructions to generate the annotations including instructions to annotate the map upon determining that the suitability parameter satisfies an annotation threshold indicating that characteristics of the surrounding environment associated with the sensor data sufficiently constrain determining the calibration parameters such that a calibration state of the onboard sensor is corrected by applying the calibration parameters and the location of the surrounding environment is to be logged using the annotations within the map.

3. The calibration system of claim 1, wherein the annotation module includes instructions to provide the map with the annotations to additional vehicles that include one or more sensors similar to the onboard sensor, and wherein the vehicle includes a set of sensors including the onboard sensor.

4. The calibration system of claim 1, wherein the calibration module includes instructions to analyze the sensor data including instructions to determine the calibration state of the onboard sensor and whether the calibration state satisfies the calibration threshold for continuing to operate the vehicle using the sensor data from the onboard sensor.

5. The calibration system of claim 4, wherein the calibration module includes instructions to, in response to determining that the calibration state does not satisfy the calibration threshold, identify, from the map, the calibration route for the vehicle that includes a suitable location for calibrating the onboard sensor, and wherein the calibration route is a deviation from the current route.

6. The calibration system of claim 1, wherein the map includes information about a network of roads, wherein the sensor data includes an observation of the surrounding environment, wherein the annotations are an electronic data structure that specify at least a type of the onboard sensor, the suitability parameter, and the location at which the suitability parameter was determined, and wherein the calibration module includes instructions to analyze the sensor data including instructions to derive the calibration parameters from characteristics of the surrounding environment.

7. The calibration system of claim 1, wherein analyzing the sensor data includes iteratively analyzing the sensor data as the vehicle operates in an autonomous mode traveling along a roadway.

8. A non-transitory computer-readable medium for improving calibration of an onboard sensor of a vehicle and including instructions that when executed by one or more processors cause the one or more processors to:

in response to acquiring sensor data from a surrounding environment of the vehicle using the onboard sensor, analyze the sensor data to determine calibration parameters for the onboard sensor;

identify a suitability parameter that characterizes how well the surrounding environment provides for determining the calibration parameters;

generate annotations within a map that specify at least the suitability parameter for a location associated with the sensor data, wherein the annotations specify which locations in the map are suitable for calibrating different types of sensors of the vehicle including the onboard sensor according to the suitability parameter; and re-route the vehicle that is operating autonomously to travel along a calibration route that is a new route and calibrate the onboard sensor when a calibration state of the onboard sensor does not satisfy a calibration threshold, wherein the instructions to re-route the vehicle cause the vehicle to deviate from a current route to follow the calibration route that includes a calibration area that is along and part of the calibration route when in route to a final destination that is common to the current route and the calibration route, and wherein the instructions to re-route include instructions to request permission to re-route the vehicle from a passenger riding in the vehicle and disengage autonomous operation of the vehicle when the passenger denies the permission to re-route.

9. The non-transitory computer-readable medium of claim 8, wherein the instructions to generate the annotations include instructions to annotate the map upon determining that the suitability parameter satisfies an annotation threshold indicating that characteristics of the surrounding environment associated with the sensor data sufficiently constrain determining the calibration parameters such that a calibration state of the onboard sensor is corrected by applying the calibration parameters and the location of the surrounding environment is to be logged using the annotations within the map.

10. The non-transitory computer-readable medium of claim 8, wherein the instructions to analyze the sensor data include instructions to determine a calibration state of the onboard sensor and whether the calibration state satisfies the calibration threshold for continuing to operate the vehicle using the sensor data from the onboard sensor.

11. The non-transitory computer-readable medium of claim 10, wherein the instructions include instructions to, in response to determining that the calibration state does not satisfy the calibration threshold, identify, from the map, the calibration route for the vehicle that includes a suitable location for calibrating the onboard sensor, and wherein the calibration route is a deviation from the current route.

12. The non-transitory computer-readable medium of claim 11, wherein the instructions include instructions to re-route the vehicle to travel along the calibration route and calibrate the onboard sensor while traveling through the suitable location that is part of the calibration route of the vehicle, and wherein the suitable location includes characteristics that improve how the calibration parameters are determined.

13. A method of improving calibration of an onboard sensor of a vehicle, comprising:

in response to acquiring sensor data from a surrounding environment of the vehicle using the onboard sensor, analyzing the sensor data to determine calibration parameters for the onboard sensor;

identifying a suitability parameter that characterizes how well the surrounding environment provides for determining the calibration parameters;

generating annotations within a map that specify at least the suitability parameter for a location associated with the sensor data, wherein the annotations specify which locations in the map are suitable for calibrating different types of sensors of the vehicle including the onboard sensor according to the suitability parameter; and re-routing the vehicle that is operating autonomously to travel along a calibration route that is a new route and calibrate the onboard sensor when a calibration state of the onboard sensor does not satisfy a calibration threshold, wherein re-routing the vehicle causes the vehicle to deviate from a current route to follow the calibration route that includes a calibration area that is along and part of the calibration route when in route to a final destination that is common to the current route and the calibration route, and wherein re-routing includes requesting permission to re-route the vehicle from a passenger riding in the vehicle and disengaging autonomous operation of the vehicle when the passenger denies the permission to re-route.

14. The method of claim 13, wherein generating the annotations includes annotating the map upon determining that the suitability parameter satisfies an annotation threshold indicating that characteristics of the surrounding environment associated with the sensor data sufficiently constrain determining the calibration parameters such that a calibration state of the onboard sensor is corrected by applying the calibration parameters and the location of the surrounding environment is to be logged using the annotations within the map.

15. The method of claim 13, further comprising:

providing the map with the annotations to additional vehicles that include one or more sensors similar to the onboard sensor.

16. The method of claim 13, wherein analyzing the sensor data includes determining a calibration state of the onboard sensor and whether the calibration state satisfies the calibration threshold for continuing to operate the vehicle using the sensor data from the onboard sensor.

17. The method of claim 16, further comprising:

in response to determining that the calibration state does not satisfy the calibration threshold, identifying, from the map, the calibration route for the vehicle that includes a suitable location for calibrating the onboard sensor, wherein the calibration route is a deviation from the current route.

18. The method of claim 17, wherein the suitable location includes characteristics that improve the calibration parameters.

19. The method of claim 13, wherein the map includes information about a network of roads, wherein the sensor data includes an observation of the surrounding environment,
- wherein the annotations are an electronic data structure that specify at least a type of the onboard sensor, the suitability parameter, and the location at which the suitability parameter was determined,
- wherein analyzing the sensor data includes deriving the calibration parameters from characteristics of the surrounding environment, and
- wherein analyzing the sensor data includes iteratively analyzing the sensor data as the vehicle operates in an autonomous mode traveling along a roadway.

\* \* \* \* \*